United States Patent
Ho

[11] Patent Number: 6,072,785
[45] Date of Patent: Jun. 6, 2000

[54] DIFFERENTIAL PSK SIGNALLING IN CDMA NETWORKS

[75] Inventor: Jin-Meng Ho, Lake Hiawatha, N.J.

[73] Assignee: AT&T Corp, New York, N.Y.

[21] Appl. No.: 08/808,776

[22] Filed: Mar. 4, 1997

[51] Int. Cl.[7] .......................... H04L 27/10; H04B 7/216; H03D 3/22
[52] U.S. Cl. ......................... 370/320; 375/279; 375/283; 375/330
[58] Field of Search ..................................... 370/320, 335, 370/441, 442, 206, 207; 375/200, 261, 298, 308, 330, 283, 279; 329/304; 332/103

[56] References Cited

U.S. PATENT DOCUMENTS

| | | | |
|---|---|---|---|
| 4,651,320 | 3/1987 | Thapar | 370/207 |
| 5,023,889 | 6/1991 | Divsalar et al. | 375/27 |
| 5,329,547 | 7/1994 | Ling | 370/342 |
| 5,506,861 | 4/1996 | Bottomley | 375/200 |
| 5,767,738 | 6/1998 | Brown et al. | 375/200 |
| 5,881,047 | 3/1999 | Bremer et al. | 370/207 |

FOREIGN PATENT DOCUMENTS

| | | |
|---|---|---|
| 0 430 587 A2 | 6/1991 | European Pat. Off. |
| WO 96/31960 | 10/1996 | WIPO |

*Primary Examiner*—Hassan Kizou
*Assistant Examiner*—Hanh Nguyen

[57] ABSTRACT

A method and a system for detecting a user signal in a CDMA network. (Coded) user message bits are grouped into successive groups. A differential phase is generated for each message bit group by mapping each message bit group on to a predetermined PSK constellation. An absolute phase is generated for each message bit group based on the differential phase for the current message bit group and the absolute phase for the preceding message bit group. The absolute phase signal is phase keyed to an RF carrier to form an RF signal. The RF signal is spread using two code sequences and the spread RF signal is transmitted. At the receiver, the RF signal is received and non-coherently demodulated. The demodulated RF signal is despread using the code sequences. Successive blocks of the demodulated, despread RF signal are phase compared for extracting the differential phase signal carrying the (coded) user message. Lastly, the user message is recovered.

39 Claims, 2 Drawing Sheets

DIFFERENTIAL PSK SIGNALLING IN CDMA NETWORKS

CROSS-REFERENCE TO RELATED APPLICATIONS

The present invention is related to U.S. patent application Ser. No. 08/808,782 entitled "Method for Multitone Division Multiple Access Communications", filed Mar. 4, 1997; U.S. patent application Ser. No. 08/808777 entitled "Method and System Providing Unified DPSK-PSK Signalling For CDMA-Based Satellite Communications", filed Mar.4, 1997; and U.S. patent application Ser. No. 08/810,557 entitled "An FFT-Based Multitone DPSK Modem", filed Mar. 4,1997, now U.S. Pat. No. 5,815,610, each commonly assigned and each of which are incorporated by reference herein.

BACKGROUND OF THE INVENTION

1. Field of the Invention

The present invention relates to the field of telecommunications. More particularly, the present invention relates to a method and a system for Code Division Multiple Access (CDMA) communications.

2. Description of the Related Art

In current Code Division Multiple Access (CDMA) systems, both coherent and non-coherent demodulation techniques are used. Coherent demodulation techniques require an accurate carrier phase estimation of a received signal, which in turn necessitates a pilot signal or a phase-locked loop. Both requirements are impractical, especially for an uplink to a satellite or a base station. Non-coherent orthogonal demodulation techniques require extensive correlation and comparison computations for symbol detection, resulting in a high implementation complexity. Additionally, non-coherent demodulation techniques provide poor performance compared to coherent approaches.

When DS-CDMA (Direct-Sequence Code Division Multiple Access) signals are coherently demodulated, accurate phase tracking of individual phases is required. When DS-CDMA signals are detected via non-coherent orthogonal demodulation, a performance penalty is paid, while also involving complex implementation. What is needed is a simple, yet powerful signalling scheme for CDMA-based communications that reduces implementation complexity while improving system performance.

SUMMARY OF THE INVENTION

The present invention provides a method and a system for demodulating multipoint-to-point and point-to-multipoint signals transmitted in a DS-CDMA network without requiring an estimate of the carrier phase. Further, the present invention provides a simple detection technique for processing demodulated signals and has a better performance than conventional non-coherent techniques.

The advantages of the present invention are provided by a method and a system in which (coded) user message bits are grouped into successive groups. A differential phase signal is generated for each message bit group by mapping each message bit group on to a predetermined PSK constellation. An absolute phase signal is generated for each message bit group by adding the differential phase for the current message bit group to the absolute phase signal for the preceding message bit group. PSK modulation is invoked with the absolute phase for each message bit group to form an RF signal. The RF signal is spread using two code sequences and then transmitted.

At the receiver, the RF signal is non-coherently quadrature demodulated and despread using the code sequences. Successive blocks of the demodulated, despread RF signal are phase compared for extracting the differential phase carrying the (coded) user message. Lastly, the user message is recovered.

BRIEF DESCRIPTION OF THE DRAWING

The present invention is illustrated by way of example and not limitation in the accompanying figures in which like reference numerals indicate similar elements and in which.

DETAILED DESCRIPTION

The present invention simplifies RF demodulation and subsequent detection processes for CDMA communication systems and, consequently, reduces implementation complexity and power requirements that place critical constraints on some applications. For example, in a wireless communications system, the present invention greatly facilitates frequency conversion and baseband processing at a base station in a cellular or PCS network, or aboard a satellite in a space system, thereby requiring less power since the present invention does not require a conventional prediction of the carrier phase for each user signal received on an uplink. Further, collective down-conversion of a received RF signal to a baseband signal for all user signals transmitted on the same carrier is possible. Corresponding hardware and power reductions are also achieved at a user terminal for a downlink, which is significant, especially for handsets or portable communication devices. Moreover, the present invention provides an efficient mechanism for separating different uplink signals for on-board satellite processing and/or downlink switching.

Figure 1:
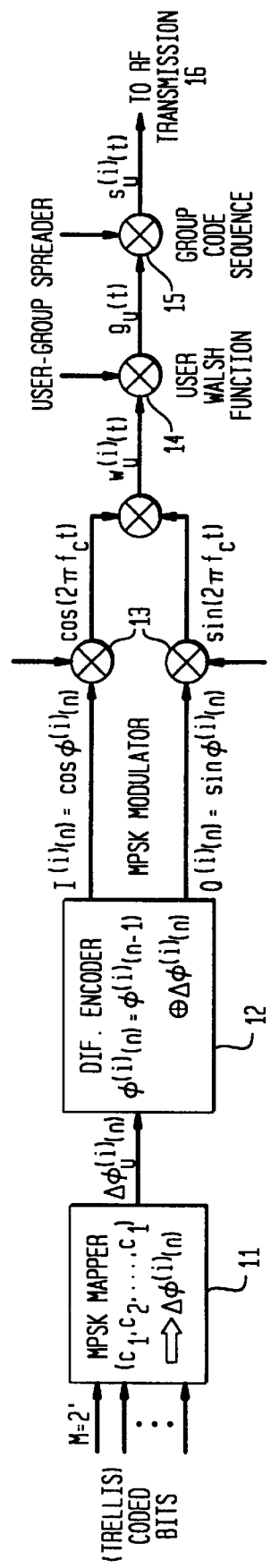
FIG. 1 is a block diagram showing the basic functional elements of a transmitter using differential PSK signalling in a DS-CDMA network according to the present invention.

FIG. 1 is a block diagram showing the basic functional elements of a transmitter using differential PSK signalling in a DS-CDMA network, for example, as part of a terrestrial wireless network, such as a cellular and a PCS, or a satellite communications network. Groups of information bits that form a user message from an application are encoded, such as trellis encoded, before being mapped into signal points in a chosen PSK constellation in a well-known manner. A bit/symbol interleaver may be employed either before or after symbol mapping for hard- or soft-decoding. The coded information bits are mapped by MPSK mapper 11 into a differential phase signal $\Delta\phi^{(i)}(n)$. The resulting phase from each group of coded information bits is treated as a differential phase. An absolute phase $\phi^{(i)}(n)$ is derived for each signalling interval by adding the differential phase $\Delta\phi^{(i)}(n)$ for the current signalling interval to the absolute phase value $\phi^{(i)}(n-1)$ for the preceding signalling interval by a differential phase encoder 12 in a well-known manner.

The absolute phase $\phi^{(i)}(n)$ is impressed on a carrier having a desired carrier frequency by using a standard PSK modulator 13. After carrier phase modulation, the modulated signal is spread in a well-known manner at 14 using a Walsh function assigned to the user by the system. Then, a group code sequence associated with, for example, a terrestrial base station or a satellite beam, is used for further spreading the modulated signal at 15 in a well-known manner before RF transmission at 16. RF amplification may be applied for generating a desired transmitted power prior to feeding the signal to a transmit antenna.

Figure 2:
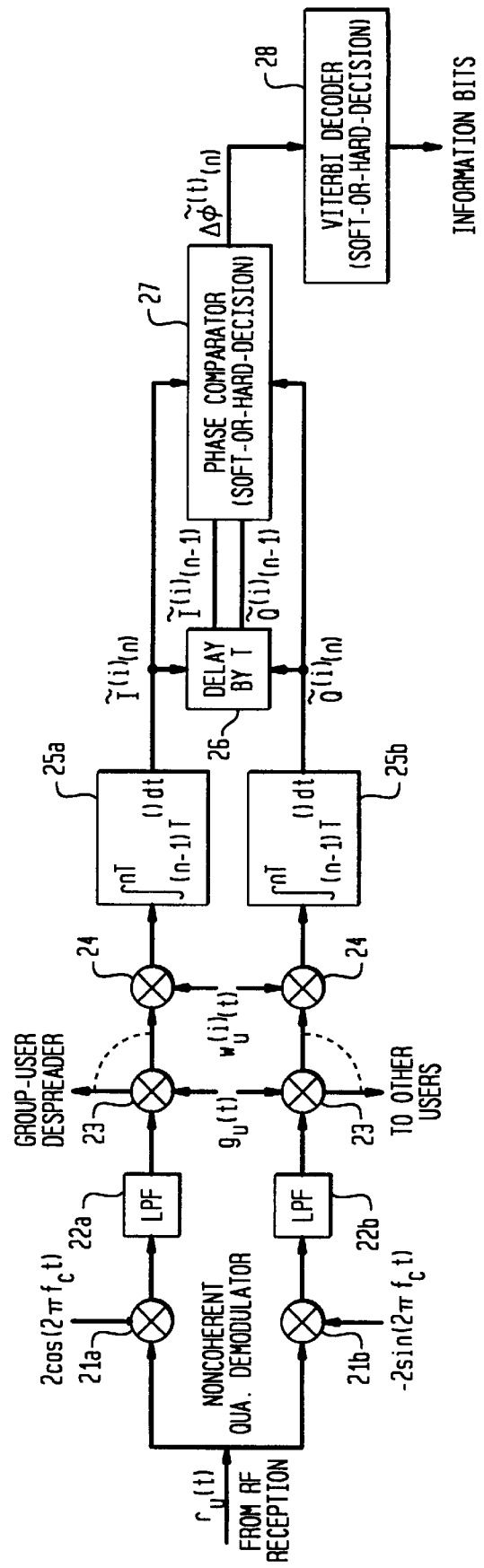
FIG. 2 is a block diagram showing the basic functional elements of a receiver using differential PSK signalling in a DS-CDMA network according to the present invention.

FIG. 2 is a block diagram showing the basic functional elements of a receiver using differential PSK signalling in a DS-CDMA network, for example, as part of a terrestrial wireless network, such as a cellular and a PCS network, or a satellite communications network. At the receiver, a received RF signal is noncoherently down-converted to a baseband signal, and then despread by code sequences corresponding to the code sequences used at the transmitter for spreading and, thereby, extracting a desired user message signal from other user signals sharing the same CDMA channel. A phase comparator is used that calculates the phase difference between two consecutive despreader outputs for detecting the user message signal, followed by a channel decoder.

In FIG. 2, after appropriate RF filtering and amplification, a received RF signal is down-converted to a baseband signal by non-coherent quadrature demodulation at 21*a* and 21*b*, and lowpass filtering at 22*a* and 22*b*. A message signal intended for a particular user is extracted from the quadrature phase components of the message signal by first despreading in a well-known manner using the group code for the user at 23, and then despreading using the user Walsh function at 24 and an integrate-and-dump process at 25*a* and 25*b*. For uplink reception, the down-conversion and group code despreading may be done collectively for all received user signals affiliated with a group. The outputs from integrator 25*a* and 25*b* are then differentially phase compared in a well-known manner at 27 using a delay of T at 26 for yielding a differential phase that carries the desired information. When bit/symbol interleaving is used at the transmitter, bit/symbol deinterleaver is employed in a well-known manner in accordance with the interleaver position. A channel decoder 28, such as a Viterbi decoder providing soft- or hard-decision, recovers the user message signal.

While the present invention has been described in connection with the illustrated embodiments, it will be appreciated and understood that modifications may be made without departing from the true spirit and scope of the invention.

What is claimed is:

1. A method for generating a user signal in a CDMA network, comprising the steps:

grouping bits of a user message into successive bit groups;

generating a differential phase for each message bit group by mapping each message bit group on to a predetermined PSK constellation;

generating an absolute phase for each message bit group by adding the differential phase for a current bit group to an absolute phase for a bit group preceding the current bit group;

performing PSK modulation using the absolute phase to form an RF signal;

spreading the RF signal using two code sequences; and transmitting the RF signal.

2. The method according to claim 1, wherein the user message bits are coded.

3. The method according to claim 1, wherein the two code sequences include a pseudo-random number sequence associated with a group of users.

4. The method according to claim 1, wherein the two code sequences include a Walsh function assigned to a user of a group of users.

5. The method according to claim 1, further comprising the steps of:

receiving the RF signal;

non-coherently quadrature demodulating the received RF signal;

despreading the demodulated RF signal using the code sequences;

phase comparing successive blocks of the demodulated, despread RF signal for extracting the differential phase carrying the user message; and recovering the user message.

6. The method according to claim 5, wherein the user message bits are coded.

7. The method according to claim 5, wherein the two code sequences include a pseudo-random number sequence associated with a group of users.

8. The method according to claim 5, wherein the two code sequences include a Walsh function assigned to a user of a group of users.

9. The method according to claim 5, wherein the RF signal is transmitted in a CDMA communications network.

10. The method according to claim 9, wherein the CDMA communications network is a satellite communications network.

11. The method according to claim 9, wherein the CDMA communications network is a cellular network.

12. The method according to claim 9, wherein the CDMA communications network is a PCS network.

13. A method for detecting a user signal in a CDMA network, comprising the steps of:

receiving a PSK-modulated CDMA signal, the received signal containing a user message that has been grouped into blocks of bits, each block of bits being differentially phase encoded and spread using two code sequences;

non-coherently quadrature demodulating the received signal;

despreading the demodulated signal using the code sequences;

phase comparing successive blocks of the demodulated, despread signal for extracting the differential phase carrying the user message; and recovering the user message.

14. The method according to claim 13, wherein the user message bits are coded.

15. The method according to claim 13, wherein the two code sequences include a pseudo-random number sequence associated with a group of users.

16. The method according to claim 13, wherein the two code sequences include a Walsh function assigned to a user of a group of users.

17. The method according to claim 13, wherein the RF signal is received in a CDMA communications network.

18. The method according to claim 17, wherein the CDMA communications network is a satellite communications network.

19. The method according to claim 17, wherein the CDMA communications network is a cellular network.

20. The method according to claim 17, wherein the CDMA communications network is a PCS network.

21. A CDMA communications system, comprising:

a PSK mapper for mapping groups of user message bits into differential phases according to a predetermined PSK constellation;

a differential phase encoder for generating a current absolute phase for each group of message bits based on a sum of the differential phase for a current group and an absolute phase for a group of message bits preceding the current group of message bits;

a PSK modulator for phase modulating an RF carrier with the current absolute phase to form an RF signal; and a spread-spectrum spreader for spreading the RF signal using two code sequences.

22. The CDMA communications system according to claim 21, wherein the user message bits are coded.

23. The CDMA communications system according to claim 21, wherein the two code sequences include a pseudo-random number sequence associated with a group of users.

24. The CDMA communications system according to claim 21, wherein the two code sequences include a Walsh function assigned to a user of a group of users.

25. The CDMA communications system according to claim 21, further comprising a transmitter for transmitting the RF signal over a CDMA communications network.

26. The CDMA communications system according to claim 25, further comprising a receiver for receiving the RF signal;

a non-coherent quadrature demodulator for demodulating the received RF signal;

a spread-spectrum despreader for despreading the demodulated RF signal using the code sequences;

a differential phase comparator for generating a differential phase for each group of bits of the user message, the differential phase being a difference between an absolute phase for a current group of bits and an absolute phase for a group of bits preceding the current group of bits; and a decoder for decoding each group of the user message bits based on a corresponding differential phase.

27. The CDMA communications system according to claim 26, wherein the user message bits are coded.

28. The CDMA communications system according to claim 26, wherein the two code sequences include a pseudo-random number sequence associated with a group of users.

29. The CDMA communications system according to claim 26, wherein the two code sequences include a Walsh function assigned to a user of a group of users.

30. The CDMA communications system according to claim 26, wherein the CDMA communications network is a satellite communications network.

31. The CDMA communications system according to claim 26, wherein the CDMA communications network is a cellular network.

32. The CDMA communications system according to claim 26, wherein the CDMA communications network is a PCS network.

33. A CDMA communications system, comprising:

a receiver for receiving an RF signal over a CDMA communications network, the RF signal being a PSK modulated CDMA signal containing a user message that has been grouped into blocks of bits, each block of bits being differentially phase encoded and spread using two code sequences;

a non-coherent quadrature demodulator for demodulating the received RF signal;

a spread-spectrum despreader for despreading the demodulated RF signal using the code sequences;

a differential phase comparator for generating a differential phase for each block of bits of the user message, the differential phase being a difference between an absolute phase for a current block of bits and an absolute phase for a block of bits preceding the current block of bits; and a decoder for decoding each group of the user message bits based on a corresponding differential phase.

34. The CDMA communications system according to claim 33, wherein the user message bits are coded.

35. The CDMA communications system according to claim 33, wherein the two code sequences include a pseudo-random number sequence associated with a group of users.

36. The CDMA communications system according to claim 33, wherein the two code sequences include a Walsh function assigned to a user of a group of users.

37. The CDMA communications system according to claim 33, wherein the CDMA communications network is a satellite communications network.

38. The CDMA communications system according to claim 33, wherein the CDMA communications network is a cellular network.

39. The CDMA communications system according to claim 33, wherein the CDMA communications network is a PCS network.

* * * * *